(12) United States Patent
Mattsson et al.

(10) Patent No.: US 12,392,881 B2
(45) Date of Patent: Aug. 19, 2025

(54) SYSTEM AND METHOD FOR DETECTING PROXIMITY OF USERS

(71) Applicant: Samsung Electronics Co., Ltd., Suwon-si (KR)

(72) Inventors: Anders Sven Mattsson, San Diego, CA (US); Gennady Feygin, San Diego, CA (US); Pranav Dayal, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 57 days.

(21) Appl. No.: 16/920,289

(22) Filed: Jul. 2, 2020

(65) Prior Publication Data

US 2021/0239819 A1 Aug. 5, 2021

Related U.S. Application Data

(60) Provisional application No. 62/971,830, filed on Feb. 7, 2020, provisional application No. 62/970,683, filed on Feb. 5, 2020.

(51) Int. Cl.
*G01S 13/04* (2006.01)
*G01S 7/03* (2006.01)

(52) U.S. Cl.
CPC ............... *G01S 13/04* (2013.01); *G01S 7/03* (2013.01); *G01S 7/038* (2013.01)

(58) Field of Classification Search
CPC . G01S 13/04; G01S 7/03; G01S 7/038; G01S 13/56; G01S 11/06; G01S 13/003
See application file for complete search history.

(56) References Cited

U.S. PATENT DOCUMENTS

| | | | |
|---|---|---|---|
| 5,077,701 A | 12/1991 | Lill | |
| 5,444,864 A * | 8/1995 | Smith | H04B 1/408 |
| | | | 455/24 |
| 8,774,145 B2 * | 7/2014 | Lin | H04W 4/21 |
| | | | 370/338 |
| 8,798,695 B1 | 8/2014 | Zheng et al. | |
| 9,906,256 B2 | 2/2018 | Prendergast et al. | |

(Continued)

FOREIGN PATENT DOCUMENTS

| | | | | |
|---|---|---|---|---|
| CN | 104170265 A | 11/2014 | | |
| CN | 110463074 A | 11/2019 | | |
| EP | 3188461 A1 * | 7/2017 | ............. | G01S 15/08 |

OTHER PUBLICATIONS

Chinese Office Action dated Dec. 17, 2024, issued in Chinese Patent Application No. 202110155783.0, 7 pages.

(Continued)

*Primary Examiner* — Vladimir Magloire
*Assistant Examiner* — Kenneth W Good
(74) *Attorney, Agent, or Firm* — Lewis Roca Rothgerber Christie LLP

(57) ABSTRACT

A system and method for detecting proximity of a user within a particular distance of a radio device is disclosed. The method includes transmitting a signal via a transmitter and antenna of the radio device, receiving a received signal via a receiver and the antenna, processing the received signal for distinguishing a signal reflected from the user from a leaked portion of the transmitted signal, and reducing power of the radio device in response to the processing.

16 Claims, 6 Drawing Sheets

(56) References Cited

U.S. PATENT DOCUMENTS

| | | | |
|---|---|---|---|
| 10,182,758 B2 | 1/2019 | Wu et al. | |
| 2009/0303103 A1* | 12/2009 | Winstead | G01S 13/103 |
| | | | 342/89 |
| 2013/0001422 A1* | 1/2013 | Lavon | G01S 13/42 |
| | | | 250/393 |
| 2013/0113647 A1 | 5/2013 | Sentelle et al. | |
| 2013/0300573 A1* | 11/2013 | Brown | A61B 5/1113 |
| | | | 340/870.01 |
| 2013/0301391 A1 | 11/2013 | Altman et al. | |
| 2015/0201385 A1* | 7/2015 | Mercer | H04W 52/367 |
| | | | 455/67.11 |
| 2016/0054436 A1* | 2/2016 | Lee | G09G 3/20 |
| | | | 345/87 |
| 2017/0206001 A1* | 7/2017 | Li | G06F 3/04883 |
| 2017/0290011 A1* | 10/2017 | Kushnir | G01S 7/006 |
| 2018/0136363 A1 | 5/2018 | Yoon et al. | |
| 2018/0262163 A1* | 9/2018 | Tokuda | G05F 3/26 |
| 2018/0309474 A1* | 10/2018 | Cheung | G01S 7/4021 |
| 2019/0044561 A1* | 2/2019 | Fernando | G01S 13/878 |
| 2019/0155276 A1* | 5/2019 | Jung | A47L 11/4013 |
| 2020/0014983 A1 | 1/2020 | McRae | |
| 2020/0205073 A1* | 6/2020 | Akkarakaran | G06F 1/1698 |
| 2020/0209350 A1* | 7/2020 | Zhang | G01S 7/352 |
| 2020/0229102 A1* | 7/2020 | Gubeskys | H04W 52/146 |
| 2020/0359330 A1* | 11/2020 | Zacharias | H04W 52/367 |
| 2021/0055385 A1* | 2/2021 | Rimini | G01S 7/417 |
| 2021/0055386 A1* | 2/2021 | Rimini | A61B 5/0507 |
| 2021/0116537 A1* | 4/2021 | Takada | G01S 13/04 |
| 2023/0031232 A1* | 2/2023 | Kiilerich Pratas | H04W 24/10 |

OTHER PUBLICATIONS

Taiwanese Office Action dated Jan. 13, 2025, issued in corresponding TW Patent Application No. 110104011 (12 pages).

* cited by examiner

SYSTEM AND METHOD FOR DETECTING PROXIMITY OF USERS

CROSS-REFERENCE TO RELATED APPLICATION(S)

The present application claims priority to and the benefit of U.S. Provisional Application No. 62/970,683, filed Feb. 5, 2020, entitled "SYSTEM AND METHOD FOR PROVIDING PROXIMITY DETECTION USING RADIO FREQUENCY (RF) SIGNALS," and claims priority to and the benefit of U.S. Provisional Application No. 62/971,830, filed Feb. 7, 2020, entitled "SYSTEM AND METHOD FOR PROVIDING PROXIMITY DETECTION USING RADIO FREQUENCY (RF) SIGNALS," the entire content of each of which is incorporated herein by reference.

FIELD

One or more aspects of embodiments according to the present disclosure relate to a communication system, and more particularly, to a system and method for detecting proximity of users using radio frequency (RF) signals.

BACKGROUND

According to the Federal Communications Commission (FCC) and other regulatory bodies, there is a limit to an amount of RF radiation or radiated power (e.g., watts/square centimeter (W/sq cm) or W/cm^3 depending on frequency range that a radio device (e.g., a mobile device such as a smart phone), can radiate onto, and into, the body of a human user. For 5th generation (5G) Frequency Range 2 (FR2) operation, such a limit is known as Maximum Permitted Exposure (MPE). When a human body is in close proximity to an antenna of the radio device this MPE limit may be exceeded. For example, this limit may be exceeded when a transmit antenna is pointing towards and/or is in close proximity (e.g. about 0-5 cm) of the user. In order to, for example, avoid violating regulatory rules (e.g., FCC rules), it may be desirable to detect whether there is radiation from the radio device to the user.

SUMMARY

Embodiments of the present disclosure are directed to a method for detecting proximity of a user within a particular distance of a radio device. The method includes transmitting a transmitted signal via a transmitter of the radio device, receiving a received signal via a receiver of the radio device, processing the received signal for distinguishing a signal reflected from the user, wherein the distinguishing is based on the transmitted signal, and reducing power of the radio device in response to the processing.

According to one embodiment, the received signal includes a leaked portion of the transmitted signal and the signal reflected from the user.

According to one embodiment, the processing of the received signal includes comparing the distinguished signal reflected from the user against a threshold value, and determining that the user is within a particular proximity of the radio device based on the comparing. The particular proximity may be between 0-10 cm.

According to one embodiment, the processing of the received signal includes identifying an estimate of the leaked portion of the transmitted signal, and subtracting the estimate from the received signal for obtaining a residual signal, and detecting power in the residual signal.

According to one embodiment, the method further includes estimating gain associated with the leaked portion of the transmitted signal, and modifying the estimate of the leaked portion based on the estimated gain.

According to one embodiment, the processing is based on the phase of the received signal.

According to one embodiment, the method includes estimating gain as seen by the reflected signal and leaked signal.

According to one embodiment, the processing is performed a plurality of times during a time period, and the method further includes determining a first value and a second value corresponding to respectively a first signal reflected from the user at a first time, and a second signal reflected from the user at a second time; identifying a variation of the first value from the second value; and determining that the user is within a particular proximity of the radio device in response to identifying the variation.

According to one embodiment, the first value and the second value include at least one of signal power levels or phase values.

According to one embodiment, the method further includes determining whether the received signal is below a minimum threshold power; and in response to determining that the received signal is below the minimum threshold power, determining that the user is within the particular proximity. The minimum threshold may be set to be below a drop in gain during power-up of the radio device.

Embodiments of the present disclosure are also directed to a radio device that includes a transmitter configured to output a transmitted signal; a receiver configured to receive a received signal; one or more antennas coupled to the transmitter and receiver, the one or more antennas being configured to transmit the transmitted signal and further configured to receive the received signal; and a processor coupled to the receiver. The processor has a memory that stores instructions that cause the processor to: process the received signal for distinguishing a signal reflected from a user from a leaked portion of the transmitted signal; and reduce power of the radio device in response to the processing.

As a person of skill in the art should recognize, embodiments of the present disclosure provide a mechanism for detecting whether a user is within a particular distance of the radio device, using hardware that already forms part of the radio device for purposes of communication, such as a transmitter, a receiver, and an antenna. Proximity detection of a user may thus be enabled without increased costs or other overhead, due to the addition of extra sensors or antennas to conduct the detection.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
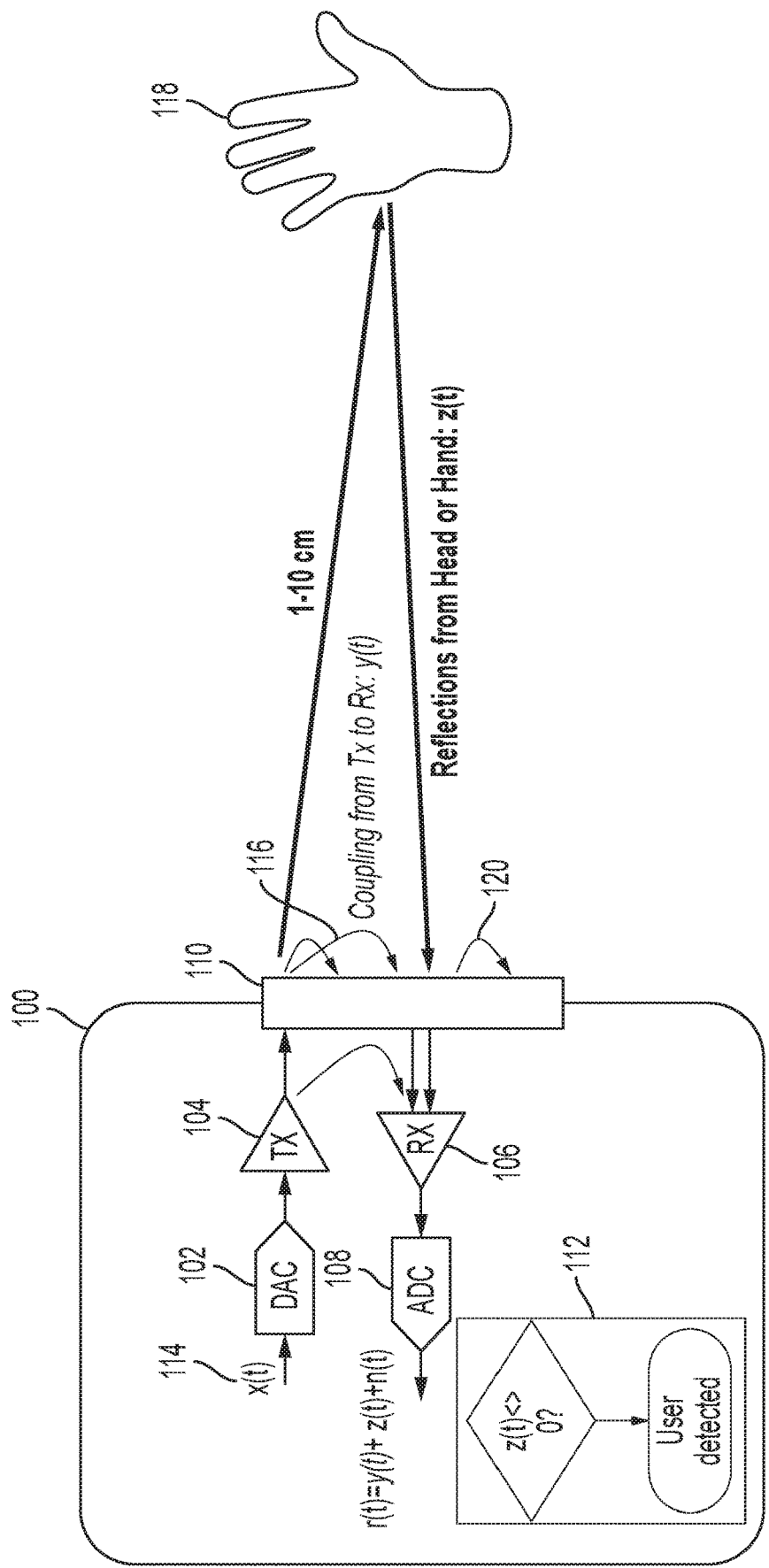
FIG. 1 is a schematic block diagram of a radio device configured for proximity detection according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Various techniques exist that may be used to try to detect whether a user is near a radio device. For example, a radar may be used for measuring a distance between the user and the radio device. However, use of a wideband radar operating at a high frequency may not be effective in detecting close proximity of the user. For example, for a radar-based approach, a minimum distance for detecting an object may be proportional to the inverse of the available bandwidth. For example, if the available bandwidth is 100 MHz, the minimum distance may be 1.5 m, d=c/(2·bw) which may be too long to be of practical use in certain cases.

Another technique that may be used may involve capacitive detectors. Capacitive detectors, however, tend to detect if any object is near the radio device, and may not distinguish between animate and inanimate objects. For example, a capacitive detector may be triggered when the radio device is placed on an inanimate object, such as a table.

Yet another technique may involve thermal infrared detection of the user. However, such an approach may fail when operated in either hot or cold climates. For example, thermal infrared detection may fail in hot climates where the ambient temperature approaches that of the user. Thermal infrared detection may also fail in colder temperatures that may cause the user's skin temperature to be lower than the user's internal temperature, or where the user's skin is covered by clothing (e.g. a glove) that is exposed to the colder temperature. The above techniques may also result in extra costs due to the addition of extra sensors or antennas.

In general terms, embodiments of the present disclosure involve a system and method that detects proximity of a human user using RF signals, without requiring extra sensors, antennas, or radars, or special signals. In one embodiment, the transmitter (TX) and receiver (RX) already present in the radio device is invoked to detect presence of the user. In one embodiment, presence of the user is detected by measuring a change in a signature (e.g., a signal characteristic such as, for example, spectrum) of a received signal relative to a transmitted signal. In this regard, there are generally two sources of signal at the receiver when the transmitter is operational: (1) leaked signal from the transmitter to the receiver (referred to as a leak-through/coupling signal); and (2) signal reflected from the user (referred to as reflected signal). A leak-through/coupling signal may be understood to include portions of an RF signal transmitted by the transmitter, that has coupled/leaked into the receiver, forming unwanted portions of a receive signal.

An embodiment of the present disclosure detects that the user is within a particular proximity of the radio device by detecting the reflected signal from the user, and if a leak-through signal is present, distinguishing the reflected signal from the leak-through signal. This method of detecting whether the user is within the particular proximity may be distinguished from mechanisms that calculate a distance of the user from the radio device. In one embodiment, when the user is detected to be within the particular proximity of the radio device, the transmitted power from the radio device may be reduced. This may be done, for example, by lowering per symbol power, reducing a duty cycle of the transmission, or a combination of both.

One benefit of the system and method that detects proximity of the user according to the various embodiments, is that the transmitter/receiver pair that is already a part of the radio device may be used to perform the proximity detection during regular operation of the transmitter. The transmitter, receiver, and antenna already present in the radio device may thus provide a dual purpose of regular communication operation, and user proximity detection. In this manner, user proximity detection may be performed without increasing power consumption, cost, and the like (compared to systems that employ additional hardware to perform the detection), while helping to ensure compliance with spectral emissions requirements. Furthermore, there may be no need to transmit any special signals using the system and method according to the various embodiments. The lack of special signals may allow the proximity detection to be performed whenever the transmitter is operational. Also, because no special signals are transmitted, there may be no interference to other users communicating via their radio devices.

FIG. 1 is a schematic block diagram of a radio device 100 configured for proximity detection according to one embodiment. The radio device may be, for example, a phone, tablet, or any other device configured to communicate using RF signals.

In one embodiment, the radio device 100 includes a digital-to-analog-converter (DAC) 102, transmitter 104, receiver 106, analog-to-digital-converter (ADC) 108, antenna 110, and processor 112. The transmitter 104 and receiver 106 may be implemented in a common radio frequency integrated circuit (RFIC), or via different RFICs, but may also be implemented in other configurations without deviating from the scope of the present disclosure. The antenna 110 may be, for example, a patch antenna array, or any type of antenna conventional for radio devices. The processor 112 may be, for example, a central processing unit (CPU) of the radio device, a baseband processor included in a baseband modem, and/or the like. It is appreciated that the transmitter 104, receiver 106, and processor 112 may be part of a common chipset or implemented in a combination of different chipsets or other implementation forms without deviating from the scope of the present disclosure. In addition, the transmitter 104, receiver 106, and antenna 110 may be components typical to, and used for, engaging in radio communication between the user and another communicating entity.

During operation, a digital version of a transmitted signal x(t) 114 is provided to the DAC 102 for conversion, and the converted signal is provided to the transmitter 104 for outputting to the antenna 110 for transmission. In one embodiment, the antenna 110 receives the signal from the transmitter, and radiates the signal as radio waves. Due to, for example, imperfections and the nature of transmitters, however, a portion of the transmitted signal is coupled back into the receiver. The portion of the transmitted signal that is coupled back is referred to as a leak-through/coupling signal y(t) 116.

In addition to the leak-through signal 116, the receiver 106 may also receive a reflected signal 120 when a user 118 is present during operation of the radio device, and a portion of the transmitted signal is reflected from the user (e.g. the user's hand, head, etc.) and fed back into the receiver. The reflected signal 120 may be referred to as z(t). In one embodiment, the transmitted signal x(t), and the combined received signal r(t) including the leak-through signal y(t), reflected signal z(t), and any noise n(t), are processed by the radio device. In this regard, the processor 112 receives the transmitted signal x(t) 114 from the transmitter 104, and the received signal r(t) from the receiver 106, and processes the signals based on instructions stored in memory (not shown). In one embodiment, the processor performs a binary classification of the combined received signal r(t). The classification may entail generating a binary digit 1 in response to detecting that a reflected signal z(t) is present in the received signal (e.g., z(t)< >0) (indicating that a user is in proximity of the radio device), or generating a binary digit 0 in response to detecting that the reflected signal z(t) is not present (e.g., z(t)=0) (indicating that there is no user in proximity of the radio device).

In some embodiments, the classification may be a soft classification that provides a probability that the user is within a certain proximity of the radio device. In this regard, the processor 112 may host a classifier that analyzes the received signal r(t), and outputs a value (e.g. a value between 0-1) indicative of the probability.

In one embodiment, a determination that a user is within a particular proximity of a radio device is made by estimating and subtracting the leak-through signal y(t) from the received signal r(t), allowing any residual signal to be interpreted as the reflected signal z(t) (assuming that noise may be ignored). The particular proximity distance may be, for example, 10 cm. Experimental data shows that in general situations, a level of the reflected signal z(t) is about the same as the level of the leak-through signal y(t) at short distances (e.g. 0-1 cm). At distances that are further away (e.g. 10 cm), the reflected signal z(t) is about 10-20 decibels (dB) weaker.

It should be noted that if the leak-through signal were to be zero, the problem of detecting the reflected signal may be simplified, as the determination may be simplified to the following:

$$\int_0^T |r(t)|^2 dt \approx \int_0^T |z(t)|^2 dt > 0?$$

Hereinafter, a following notation will be used to reflect power level (signal amplitude) of the received signal over time:

$$\int_0^T |r(t)|^2 dt = \|r(t)\|_2^2,$$

which is a mathematical notation for the "Norm" of a signal (also simply referred to as the received signal r(t)).

In the scenario where there is no leak-through signal, the received signal r(t) may be zero if there are no objects near the antenna 110. This is generally because when there are no objects near the antenna, there may be no reflected signal, leaving z(t) to also be zero. Since both y(t) and z(t) are zero, and noise n(t) may be ignored, r(t)=0.

If, however, there is an object near the antenna 110, the received signal r(t) may be equal to the reflected signal z(t) assuming, again, that there is no leak-through signal. Thus, when there is no leak-through signal, a proximity of a user may be detected by checking whether $\|r(t)\|_2^2>0$. However, in a practical system, the leak-through signal y(t) may generally be strong, and simply checking whether $\|r(t)\|_2^2>0$ may be insufficient for detecting whether a user is within a certain proximity of the radio device.

In one embodiment, the processor 112 is configured to estimate the leak-through signal y(t) to generate an estimated leak-through signal $\widehat{y(t)}$, and subtract the estimated leak-through signal $\widehat{y(t)}$ from the received signal r(t) for obtaining an estimate of the reflected signal, as follows:

$$\|r(t)-\widehat{y(t)}\|_2^2 = \|y(t)+z(t)+n(t)-\widehat{y(t)}\|_2^2 \approx \|z(t)\|_2^2$$

The value $\|r(t)-\widehat{y(t)}\|_2^2$ may also be referred to as a residual signal.

In one embodiment, the estimated leak-through signal $\widehat{y(t)}$ is obtained by modelling y(t) as a filtered version of x(t). The estimated leak-through signal $\widehat{y(t)}$ may be set as part of factory calibration for the radio device, based on an assumed value of y(t), and stored in memory of the radio device for use in determining the reflected signal. According to one embodiment, if the residual signal $\|r(t)-\widehat{y(t)}\|_2^2$ is greater than a given threshold (e.g. greater than 0), the user may be deemed to be in close proximity (e.g. within a particular distance) of the radio device.

Figure 2:
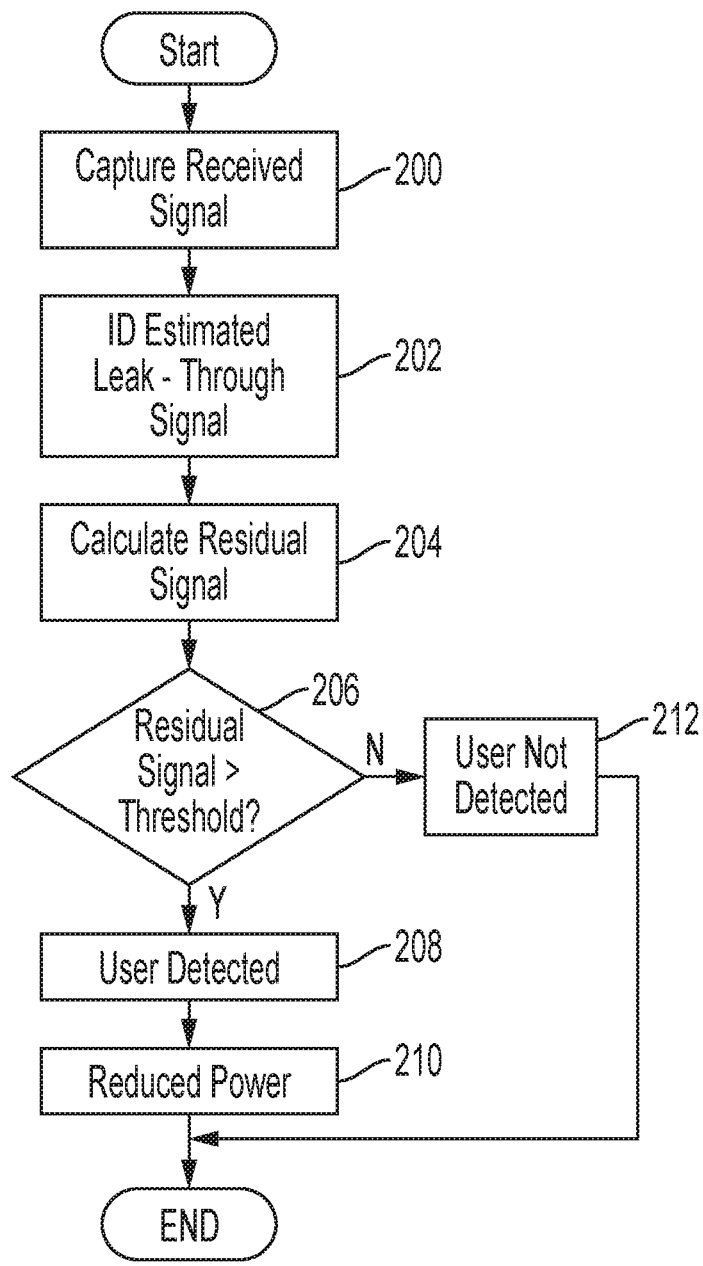
FIG. 2 is a flow diagram of a process for detecting whether a user is within a particular proximity of a device based on absolute signal amplitudes, according to one embodiment.

FIG. 2 is a flow diagram of a process for detecting whether a user is within a particular proximity of the radio device 100 based on absolute signal amplitudes, according to one embodiment. It should be understood that the sequence of steps of the process is not fixed, but can be altered into any desired sequence as recognized by a person of skill in the art.

The process starts, and in block 200, the receiver 106 receives a received signal r(t) that may include a leaked portion of a signal transmitted by the transmitter 104 (leak-through signal y(t)), reflected signal z(t), and any possible noise. The received signal r(t) is provided to the processor 112 for distinguishing the reflected signal z(t) from the leak-through signal y(t), to determine whether there is a user within a particular distance of the radio device 100 (e.g. antenna 110).

In this regard, in block 202, the processor 112 identifies an estimated leak-through signal $\widehat{y(t)}$. In one embodiment, the leak through signal y(t) is deemed to be substantially close to $\widehat{y(t)}$ (y(t)≈$\widehat{y(t)}$). The estimated leak-through signal $\widehat{y(t)}$ may be pre-stored in memory of the radio device as part of factory calibration, and retrieved by the processor in block 202 for making the proximity determination.

In block 204, the processor 112 determines a value of a residual signal by subtracting the estimated leak-through signal $\widehat{y(t)}$ from the received signal r(t) to obtain an estimate of the reflected signal (that ignores noise) as follows:

$$\|r(t)-\widehat{y(t)}\|_2^2 = \|y(t)+z(t)+n(t)-\widehat{y(t)}\|_2^2 \approx \|z(t)\|_2^2$$

In block 206, the processor 112 compares the residual signal (estimated to be z(t)), against a threshold value. If the residual signal is greater than the threshold value (e.g. greater than 0), a user is detected, in block 208, as being within a particular proximity of the radio device. The particular proximity may be, for example, between 0-10 cm of the radio device. In one embodiment, the processor 112 may generate a binary digit 1 in response to detecting that the residual signal is greater than the threshold value. In some embodiments, the processor 112 may output a value indicative of a probability that the user is within the particular proximity. The probability value may be, for example, based on the value of the calculated residual signal. For example, the higher the residual signal, the higher the probability.

In block 210, the processor transmits a signal for reducing power of the radio device 100. For example, the power may be reduced by lowering per symbol power, reducing a duty cycle of the transmission, or a combination of both.

Referring again to block 206, if the residual signal is not greater than the threshold value, no user is detected in block 212. In this regard, the processor may generate a binary digit 0 to indicate the lack of detection, or may output a probability that the user is not within the particular proximity distance.

In one embodiment, in measuring the received signal or the residual signal that approximates z(t), the processor 112 utilizes absolute power (signal amplitude) levels. In one embodiment, the processor may also consider variations in the power levels over time. Considering such variations may allow the processor to distinguish a human user (e.g., a user's head, hand, etc.) from an inanimate object (e.g., a table, bed, etc.). The distinction may be useful as power reduction may not be required if an object detected to be within the particular proximity distance of the radio device, is an inanimate object.

Figure 3:
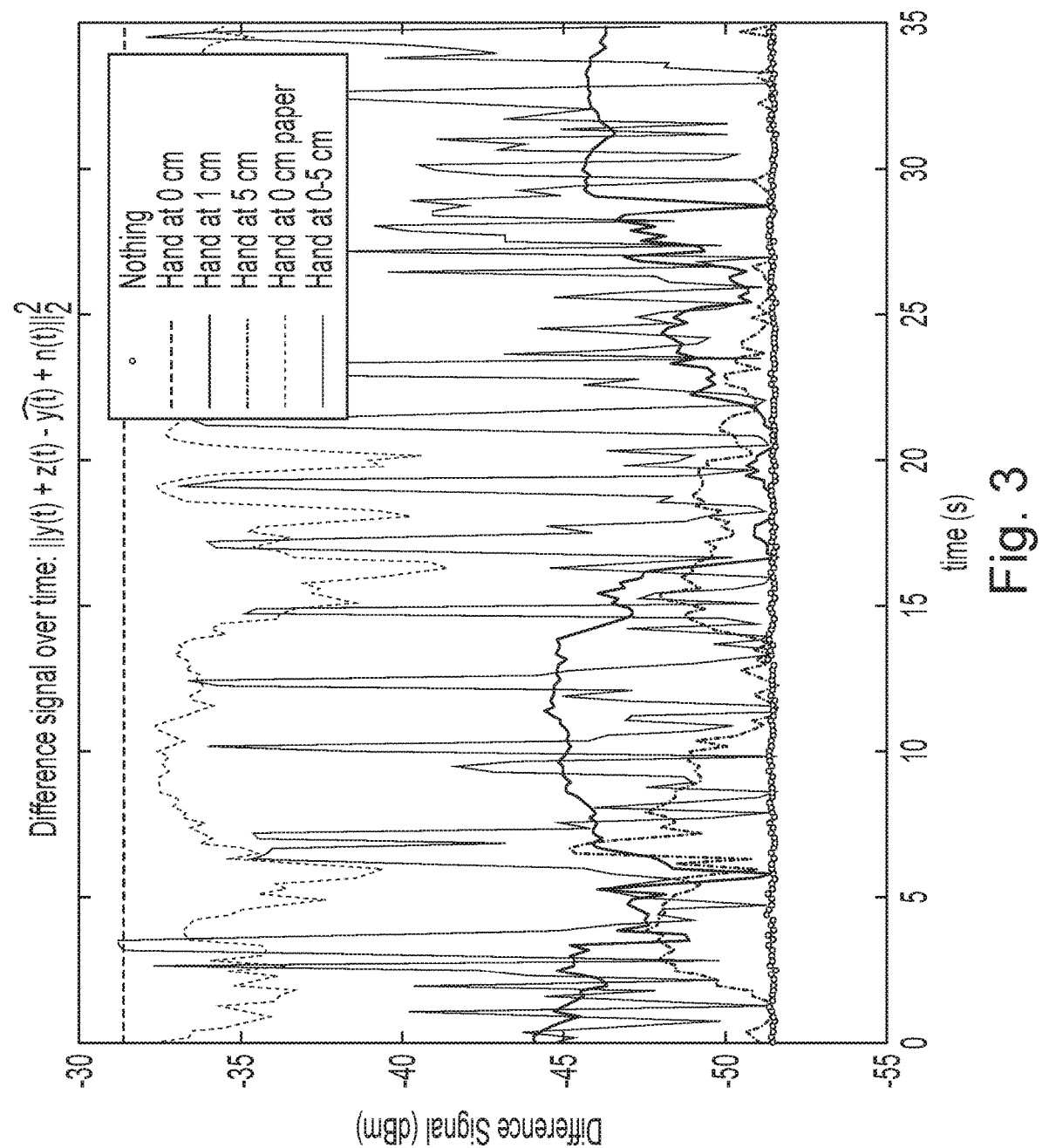
FIG. 3 is a graph of example difference signals over time, when a user's body part is at different distances from an antenna of a radio device.

Experiments show that for an inanimate object, a received signal power does not significantly vary over time. However, for an animate object, the received signal power may vary. In one embodiment, the processor 112 is configured to determine that an object within a particular proximity to the radio device, is a human user, in response to detecting that the residual signal power $\|r(t)-\widehat{y(t)}\|_2^2$, varies over time for a given time period. The variation in the power level may be, for example, a few dB, where the closer the object, the larger the variation. FIG. 3 is a graph of example difference signals over time ($\|y(t)+z(t)+n(t)-\widehat{y(t)}\|_2^2$), in response to a user's body part (e.g. the user's hand) being placed at different distances from the antenna.

Figure 4:
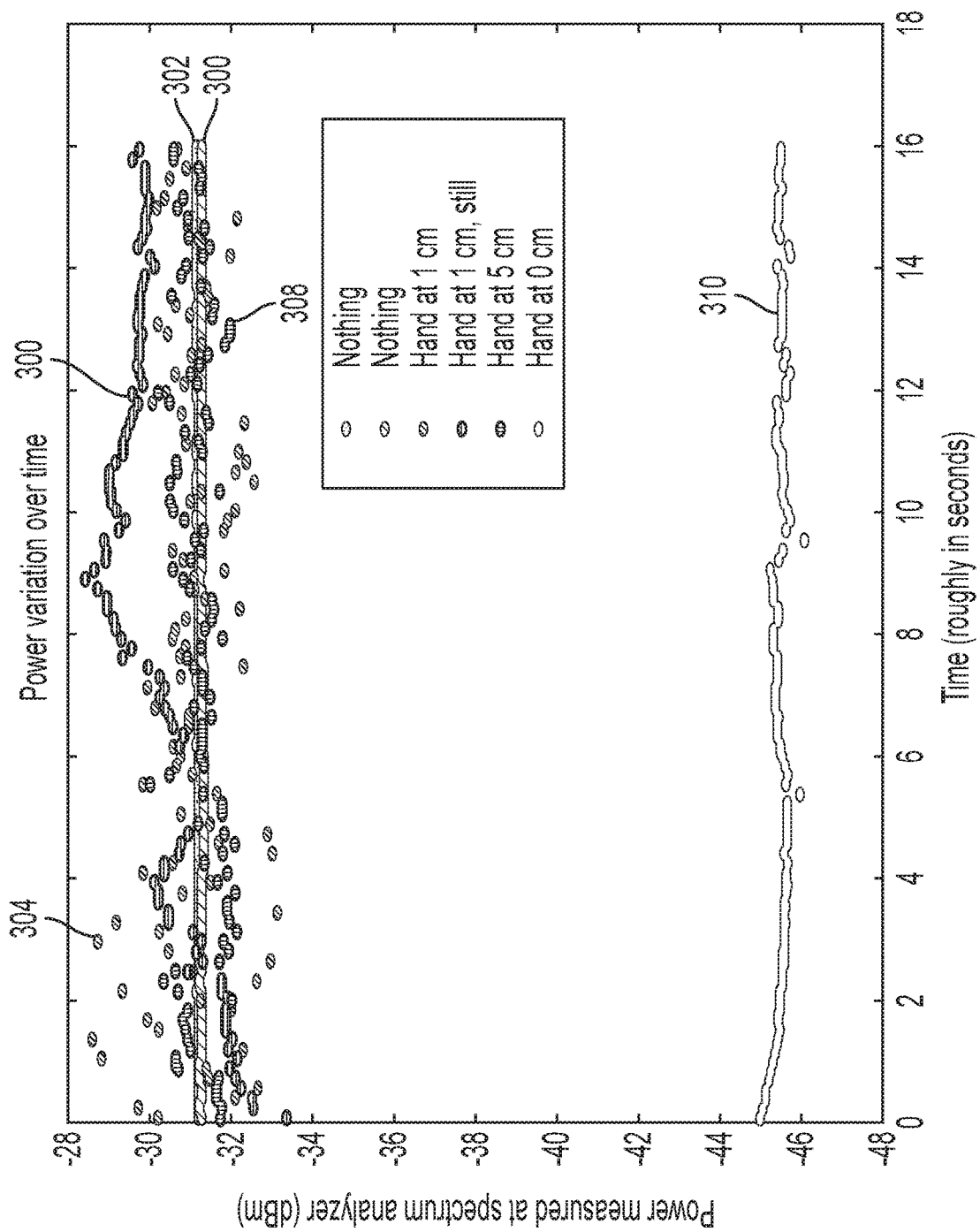
FIG. 4 is graph of example power variation over time, when a user's body part is at different distances from an antenna of a radio device.

FIG. 4 is graph of example power variation over time for a user's body part at different distances. Experiments show that when there are no objects in front of the antenna, there are no variations of power over time, as depicted by plots 300-302. Experiments also show that there are no variations of power over time when an object touches the antenna, as depicted by plot 310. However, when an animate object is near, but not touching, the antenna (e.g. within 1-5 cm), experiments show that there is perceivable variation of the received signal level $\|r_t\|_2^2$, as depicted by plots 304-308. The variation may be due to high carrier frequency of the signal (e.g. about 30 GHZ). At such a frequency, a small movement (e.g. 2.5 mm) of the animate object (e.g. the user's hand) may result in a significant phase shift (e.g. 180 deg phase shift). Small movements (e.g. fractions of a millimeter) of the body part that causes variations in the signal level may be explained by the following equation:

$$r(t) \approx y(t)+\exp(i\theta(t))z(t) \approx x(t)(k_y+k_z \cdot \exp(i\theta(t)))$$

In this equation, y(t) and z(t) add to the signal level r(t), but changes in the phase θ(t) forces the level r(t) to vary between $k_y \pm k_z$. For a hand 1 cm away, the variations may be very noticeable because the signal level is high. As the distance increases, the level gets lower. At a distance of 10 cm, the variation may still be noticeable, but may be weaker.

In one embodiment, the received signal data is tracked/captured at different points in time, and the residual power is computed based on the tracked signal data. The captured signal data may be referred to as $p_n$, where:

$$p_n = \int_{t_n}^{t_n+T} |r(t)|^2 dt$$

According to one embodiment, a value for $p_n$ is calculated about 5-10 times per second, taking into account, for example, a general speed in which a person's hand moves (e.g. $t_n$=0.1 s, 0.2 s, 0.3 s, etc.). It should be appreciated that shorter integration times may be used (e.g. on the order of microseconds), without departing from the scope of the present disclosure.

In one embodiment, if there are no objects in front of the antenna 110, the calculated values of $p_n$ remain substantially constant. However, if there are objects in front of the antenna the calculated values of $p_n$ may vary. Thus, according to one embodiment, the processor 120 may be configured to look for variations in the calculated residual data for determining whether a detected object is a human user or not.

In some instances, however, variation in captured data may be due to fluctuation in gain, and not because there is a human user within a particular proximity of the radio device. Fluctuation in the gain may occur, for example, when the radio device 100 is powered-up, and the RF signal and dissipated power heats up the device. In this situation, the leak-through signal y(t) may no longer be constant over time, but may behave as if y(t) has gain that drops off.

Figure 5:
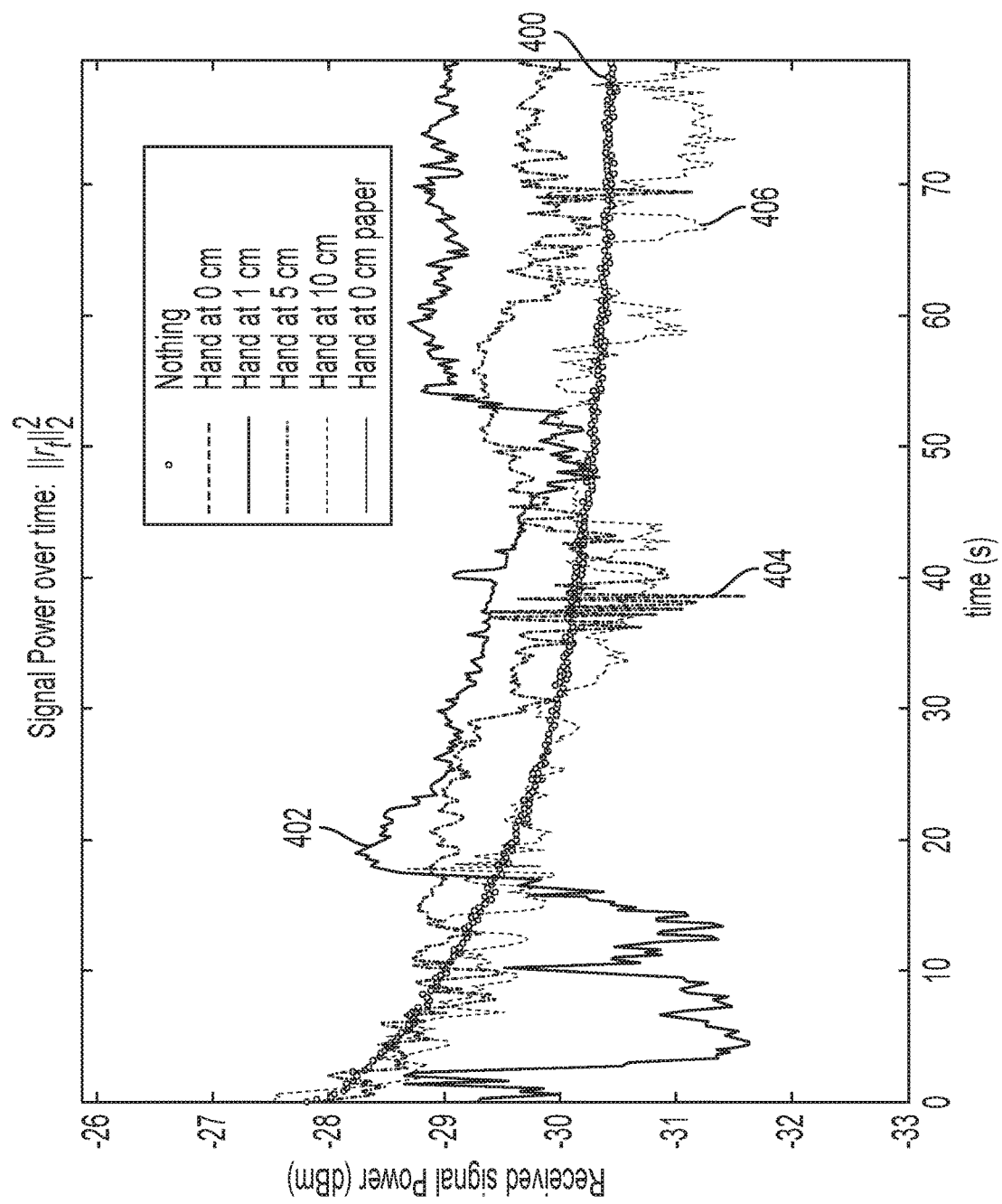
FIG. 5 is a graph of received signal power during power-up of a radio device according to one embodiment.

FIG. 5 is a graph of the received signal power during power-up of the radio device 100 according to one embodiment. Plot 400 depicts the signal power over time, when there are no objects in front of the antenna 110. As shown by plot 400, a change (e.g. drop) in the received signal power may occur due to drop in the gain, despite the fact that there are no objects in front of the antenna. The drift of the gain occurs over time, and may be deemed to be variation of the signal power. In this case, an algorithm that determines proximity of a user based on variation of the received signal power may, due to drop in the gain, inaccurately determine that there is a user is within a particular proximity of the radio device. Similarly, an algorithm that estimates y(t) to be $\widehat{y(t)}$ (y(t)≈$\widehat{y(t)}$), and subtracts $\widehat{y(t)}$ from the received signal r(t) to get the residual signal, may make an incorrect prediction of the proximity of the user to the radio device, due to the variation of the leak-through signal y(t).

One or more mechanisms may be invoked for addressing the change in gain during power-up, or other situations where transmitters fluctuate in gain. For example, the processor 112 may wait (e.g. 30 seconds) until the gain variation has settled after power-up, prior to making a proximity determination. The processor 112 may further determine how gain changes over time, and take that into account in calculating the values of $p_n$ over time.

In one embodiment, change in gain during power-up is addressed by the processor 112 via an algorithm that distinguishes variation in signal power due to movement of a user, from variation in signal power due to heating of the device at power-up. Experiments show that when the radio device heats up, a gain change occurs in the leak-through signal y(t). The gain change, however, is slow compared to change due to movement of an animate object (e.g. a user's hand) in front of the antenna 110. Plot 400 shows that the gain is fairly constant over a time period (e.g. a few seconds), when there are no objects in front of the antenna. However, when a user's hand is 1-10 cm away from the antenna 110, the signal level changes at a faster rate, as depicted in plots 402-406.

In one embodiment, in order to account for variation in the received signal power due to heating up of the radio device, the processor 112 is configured is monitor for variations in the received signal for a preset, short time period (e.g. 1-4 seconds). According to this embodiment, if a gain change occurs during this time period, it is considered to be due to movement of an object in front of the antenna.

In one embodiment, gain is tracked as it changes over the preset time period, and the estimated/tracked gain g is considered in distinguishing the reflected signal z(t) from the received signal r(t) according to the following formula:

$$\|r(t)-g\cdot \widehat{y(t)}\|_2^2 = \|y(t)+z(t)+n(t)-g\cdot \widehat{y(t)}\|_2^2$$

In one embodiment, the processor 120 is configured to capture data multiple times during the preset time period (e.g. 5 times a second), where a particular capture $p_n$ is calculated as follows:

$$p_n = \|r(t)-g\cdot \widehat{y(t)}\|_2^2$$

In one embodiment, the gain g is estimated for a first capture of each set of 10 captures. When there are no objects in front of the antenna 110, experiments show that the gain drift is small during the preset time period, even if the module is heating up, and the value of the captured signal is close to 0 as depicted in the below formula:

$$p_n = \|r(t)-g\cdot \widehat{y(t)}\|_2^2 \approx 0$$

When there are, however, objects in front of the antenna (e.g. within 1-10 cm), experiments show that there is a change in the reflected signal z(t) even during the initial power-up, and $p_n = \|r(t)-g\cdot \widehat{y(t)}\|_2^2 > 0$. In one embodiment, values for captures during the initial power-up (e.g. 10 captures over 2 seconds) are evaluated for determining the variance of the received signal. In the event that variance is detected (e.g. excessive variance), a determination may be made that a user is within a particular proximity of the antenna 110.

In one embodiment, the processor 112 considers another scenario in determining proximity of a user to the radio device. The scenario arises when a body part of the user (e.g. the user's hand) touches the antenna 110. Experiments show that in this scenario, the signal level is low and constant, and there are no variations in the captured data ($p_n$'s), as depicted by plot 310 of FIG. 4. In one embodiment, the processor 112 accounts for this scenario by determining whether power of the received signal $\|r(t)\|_2^2$ is lower than a minimum expected threshold. In this regard, the processor may invoke an algorithm with two parts to account for this scenario. During a first part, the algorithm may determine whether there are quick variations in the signal by evaluating values of, for example, 10 captures ($p_n$'s) over about 2 seconds, as previously discussed. Even when there are no detected variations, the algorithm may determine whether the lack of variations is due to the user's body part (e.g. the user's hand) being on the antenna. In this regard, the algorithm may, during a second part, determine whether the value of $\|r(t)\|_2^2$ (or the captured data $p_n$) is lower than a minimum threshold (e.g. lower than −44 decibel-milliwatts (dBm)). The drop of the value of $\|r(t)\|_2^2$ (due to the user's body part being on the antenna), may be significant compared to drop in the gain due to heating. Thus, the minimum threshold may be set to be significantly lower than the drop in the gain due to heating. Proximity of the user may be detected if the determined value of $\|r(t)\|_2^2$ is lower than the minimum threshold.

An advantage of the above two-part algorithm is that there may be no need to track or know the gain of the system, including gain changes as the radio device heats up. A rough estimate of the gain may suffice for determining whether $\|\ \|_2$ is significantly lower than expected (as set by the minimum threshold).

In one embodiment, an algorithm is employed that also considers fluctuations in gain in determining whether a user is within a certain proximity of the radio device, but limits the values of the tracked gain to be within set bounds. In this regard, the algorithm may track the changing gain due to heating, but gain values that are outside reasonable limits (e.g. outside a few dBs) may not be allowed (e.g. when the user's hand touches the antenna). Given the constraint in the gain value, the values of $\|y(t)+z(t)+n(t)-g\cdot \widehat{y(t)}\|_2^2$ may allow to remain small if there are no objects in front of the antenna 110, even if the user's hand is touching the antenna.

Figure 6:
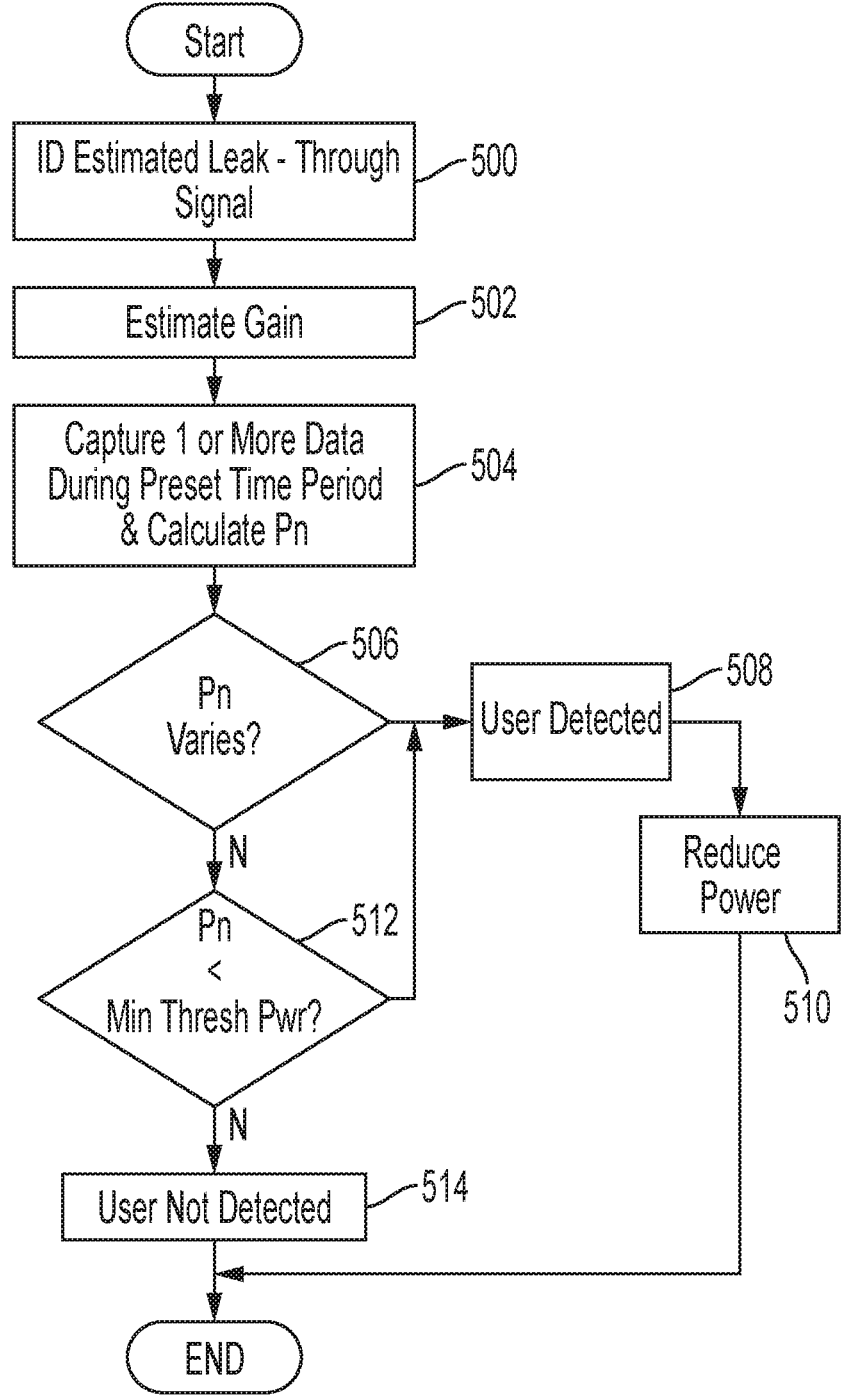
FIG. 6 is a flow diagram of a process for detecting whether a user is within a particular proximity of a radio device according to one embodiment, that considers fluctuations in signal power levels.

FIG. 6 is a flow diagram of a process for detecting whether a user is within a particular proximity of the radio device 100 according to one embodiment, that considers fluctuations in signal power levels. It should be understood that the sequence of steps of the process is not fixed, but can be altered into any desired sequence as recognized by a person of skill in the art.

The process starts, and in block 500, the processor 112 identifies an estimated leak-through signal $\widehat{y(t)}$ (similar to block 202 of FIG. 2).

In block 502, the processor 112 estimates a gain g. In one embodiment, the gain is estimated for a first capture of a set of captures. For example, gain may be estimated for a first of each set of 10 captures.

In block 504, the receiver 106 captures one or more received signals r(t) over a short, preset period (e.g. 2 seconds). In one embodiment, the receiver 106 captures data about 5 times a second, and for each capture, calculates $p_n = \|r(t) - g \cdot \widehat{y(t)}\|_2^2$.

In block 506, a determination is made as to whether there is in variation of signal power for the captured data $p_n$. If the answer is YES, the user is detected to be within a certain proximity of the radio device 100 in block 508, and power of the radio device is reduced in block 510.

If the answer is NO, a determination is made as to whether the lack of variation is due to a user's body part touching the radio device 100 (e.g. antenna 110). In this regard, in block 512, a determination is made as to whether the value of the received signal $\|r(t)\|_2^2$ (or the captured data $p_n$) is lower than a minimum threshold. If the answer is YES, the user is detected in block 508. If the answer is NO, no user is detected in block 514.

In one embodiment, the process of FIG. 6 may be modified to consider changes in phase measurements, in addition to signal amplitude, for determining whether a user is within a particular proximity of the radio device 100. In this regard, it should be noted that:

$$\|y(t)+z(t)+n(t)-\widehat{y(t)}\|_2^2 \approx \|r(t)-\widehat{y(t)}\|_2^2 = \|r(t)\|_2^2 + \|\widehat{y(t)}\|_2^2 - 2\mathrm{Real}\langle r(t), \widehat{y(t)} \rangle$$

where $$\langle r(t), \widehat{y(t)} \rangle = \int_0^T r(t)\overline{y(t)}\,dt,$$

where $\overline{y(t)}$ is the conjugate of $\widehat{y(t)}$.

In one embodiment, a cross correlation $p_n = \langle r(t), \widehat{y(t)} \rangle$ may be used for performing the detection of the proximity of the user, where the cross correlation contains phase information.

As discussed, when there are no objects in front of the antenna 110, then:

$$r(t) = y(t) + n(t)$$

and $$\langle r(t), \widehat{y(t)} \rangle = \int_0^T y(t)\overline{y(t)}\,dt + \int_0^T n(t)\overline{y(t)}\,dt = \int_0^T y(t)\overline{y(t)}\,dt + 0$$

As shown in the above formula, using the cross correlation suppresses the noise. In addition, when there are no objects in front of the antenna, the leak-through signal y(t) is constant, resulting in the cross correlation also being constant.

When there are objects in front of the antenna, the cross correlation may be depicted as:

$$\langle r(t), \widehat{y(t)} \rangle = \int_0^T y(t)\overline{y(t)}\,dt + \int_0^T z(t)\overline{y(t)}\,dt + \int_0^T n(t)\overline{y(t)}\,dt = \int_0^T y(t)\overline{y(t)}\,dt + \int_0^T z(t)\overline{y(t)}\,dt$$

Because the phase of the reflected signal z(t) changes when there is an object in front of the antenna, the term $$\int_0^T z(t)\overline{y(t)}\,dt$$

has a changing phase, so that:

$$\langle r(t), \widehat{y(t)} \rangle \approx k_y \int_0^T x(t)\overline{x(t)}\,dt + \exp(i\theta(t)) \cdot k_z \int_0^T x(t)\overline{x(t)}\,dt$$

As depicted in the above formula, as the phase, $\theta(t)$, changes due to even minute movements of the hand, the cross correlation also changes over time when there is something in front of the antenna (e.g. at a distance of 1 cm or more). More specifically, in the above formula, it should be noted that, since both z(t) and y(t) (and hence, $\widehat{y(t)}$) are both similar to scaled versions of x(t), but due to movements in the hand/head, the scaling constant (constant $k_z$) for $z_t$ changes while the scaling constant (constant $k_y$) for y(t) (and hence, $\widehat{y(t)}$) is constant in time. This change may be approximated as a change in amplitude and phase (i.e. constant $k_z$ is changing). In this regard:

$$\langle r(t), \widehat{y(t)} \rangle \approx \langle r(t), x(t) \rangle \approx \langle k_y x(t) + \exp(i\theta(t)) \cdot k_z \cdot \exp(i\theta(t)) \cdot k_z, x(t) \rangle =$$

$$k_y \int_0^T x(t)\overline{x(t)}\,dt + \exp(i\theta(t)) \cdot k_z \int_0^T x(t)\overline{x(t)}\,dt = K(k_y + \exp(i\theta(t)) \cdot k_z)$$

In other words, by correlating (i.e. taking the inner product), an expression is found that is varying due primarily to the time changing phase of the reflected signal, $\exp(i\theta(t))$, since the other parts, $k_y$, $k_z$ and K, are substantially constant in comparison. Hence, according to one embodiment, taking $\langle r(t), \widehat{y(t)} \rangle$ or $\langle r(t), x(t) \rangle$ captures phase variations caused by even small movements of the user's body part (e.g. hand or head).

In one embodiment, in taking several captures of r(t), the values of $\|r(t)\|_2^2$, $\|y(t)\|_2^2$ and $\|z(t)\|_2^2$ depend on the values of $$\|x(t)\|_2^2 = \int_0^T x(t)\overline{x(t)}\,dt.$$

Although capturing long data sequence allows the values to be constant, the length (T) of data captures becomes greater. It desirable to use a small amount of data by using small values of T. In one embodiment, variations caused by changes in $\|x(t)\|_2^2$ may be reduced by normalizing the correlation by $\|\widehat{y(t)}\|_2^2$, allowing the data captures to be shorter. According to this embodiment, the values used for doing the detection may be represented as follows:

$$p_n = \frac{\langle r(t), \widehat{y(t)} \rangle}{\|\widehat{y(t)}\|_2^2} = \frac{\langle r(t), \widehat{y(t)} \rangle}{\langle \widehat{y(t)}, \widehat{y(t)} \rangle} = \frac{\int_0^T z(t)\overline{y(t)}\,dt}{\int_0^T \widehat{y(t)}\,\overline{y(t)}}.$$

As discussed with respect to the embodiment of FIG. 6, when there are no objects in front of the antenna 110, the values of $p_n$ as computed above may be substantially constant during a short time period (e.g. 0-2 seconds), even if the radio device 100 is heating up. In this case, the processor 112 may determine that there is no user within a particular proximity of the radio device.

When there is an object in front of the antenna at a distance of about 1 cm or more, the variations in the values of $p_n$ may be substantially significant. In this case, the processor 112 may determine that there is user within the particular proximity of the radio device.

When an object is touching the antenna 110, the $p_n$ values may be stable, but significantly lower than what they would be with nothing in front of the antenna. In this case, the processor 112 may determine that an object is touching the antenna 110.

In one embodiment, the calculation of $p_n$ may be slightly varied as follows:

$$p_n = \frac{\langle r(t), x(t) \rangle}{\|x(t)\|_2^2} \approx k_y + \exp(i\theta(t)) \cdot k_z$$

This is based on the fact that $\hat{y}_t \approx k_y x_t$ and $z(t) \approx k_z x(t)$. An advantage of this embodiment is that there is no need to try to estimate $\hat{y}_t$, while emphasizing that it is the gain ($k_y + \exp(i\theta(t)) \cdot k_z$) that is estimated. This offers statistical advantages that allow the use of shorter data captures.

In one embodiment, the process of FIG. 6 may also be modified to consider changes in phase measurements without considering signal amplitude. This may be desirable, for example, in situations where the received signal fed-back into the receiver 106 (e.g. leak-through and/or reflected signal) is strong, and may saturate (clip) the receiver. The magnitude of the received signal m, may be lost if the receiver saturates (clips). This situation may be addressed by rewriting r(t) in terms of amplitude and phase as follows:

$$r(t) = m_r(t) e^{i\varphi_r(t)}$$

The saturated received signal may be mathematically described as:

$$\frac{r(t)}{|r(t)|} = e^{i\varphi_r(t)}$$

As one may appreciate, phase information is maintained although amplitude information is gone. The reflected signal z(t) may also cause a phase shift in the received signal whenever it is present, given approximately as:

$$r(t) \approx y(t) + \exp(i\theta(t))z(t) \approx x(t)(k_y + k_z \cdot \exp(i\theta(t))),$$

where the phase $\varphi_r(t)$ may be represented as follows (assuming $k_y > k_z$ and they are real numbers):

$$\varphi_r(t) = \varphi_r(t) + \arctan\left(\frac{k_z \cdot \sin(\theta(t))}{k_y + k_z \cdot \cos(\theta(t))}\right).$$

It should be appreciated that the phase of the received signal varies as a function of phase of the reflected signal, which is also true irrespective of whether the assumptions ($k_y > k_z$ and they are real numbers) are true or not.

In this case, the values used for the detection may be:

$$p_n = \frac{\langle \overline{y(t)}, r(t)/|r(t)| \rangle}{\|\overline{y(t)}\|_2^2}.$$

Although according to this embodiment the values used for the detection has changed, the detection process described in FIG. 6 may still be applied, with one difference being that the correlation is done using an actual captured signal, which is r(t)/|r(t)| due to saturation, instead of r(t).

In some embodiments, the processor discussed above, is implemented in one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for detecting proximity of users have been specifically described and illustrated herein, many modifications and variations will be apparent to those skilled in the art. Accordingly, it is to be understood that a system and method for detecting proximity of users constructed according to principles of this disclosure may be embodied other than as specifically described herein. The disclosure is also defined in the following claims, and equivalents thereof.

What is claimed is:

1. A method for detecting proximity of a user within a particular distance of a radio device, the method comprising:
   transmitting a transmitted signal, via a transmitter and an antenna of the radio device, to engage in radio communication with another communication device;
   receiving a received signal via a receiver of the radio device, wherein the received signal includes a leaked portion of the transmitted signal and signal reflected from the user;
   processing the received signal;
   determining, based on the processing of the received signal, that the received signal is below a minimum threshold power;
   in response to determining that the received signal is below the minimum threshold power, detecting that the user is in proximity of the radio device;
   determining a first value and a second value corresponding to respectively a first signal reflected from the user at a first time, and a second signal reflected from the user at a second time, wherein the first value and the second value include signal power levels;
   identifying a variation of the first value from the second value; and
   determining that the user is in proximity of the radio device in response to identifying the variation; and
   reducing power of the radio device in response to detecting that the user is in proximity of the radio device.

2. The method of claim 1, wherein the processing of the received signal includes:
   comparing the signal reflected from the user against a threshold value; and
   determining that the user is within a particular proximity of the radio device based on the comparing.

3. The method of claim 2, wherein the particular proximity is between 0-10 cm.

4. The method of claim 1, wherein the processing of the received signal includes:
   identifying an estimate of the leaked portion of the transmitted signal;
   subtracting the estimate from the received signal for obtaining a residual signal; and
   detecting power in the residual signal.

5. The method of claim 4 further comprising:
   estimating gain associated with the leaked portion of the transmitted signal; and
   modifying the estimate of the leaked portion based on the estimated gain.

6. The method of claim 4, wherein the processing is performed a plurality of times during a time period.

7. The method of claim 1, wherein the minimum threshold power is set based on drop of signal power from a drop in gain during power-up of the radio device.

8. The method of claim 1, wherein the reducing the power of the radio device includes lowering a per symbol power.

9. The method of claim 1, wherein the reducing the power of the radio device includes reducing a duty cycle of a transmission.

10. A radio device comprising:
    a transmitter configured to output a transmitted signal to engage in radio communication with another communication device;
    a receiver configured to receive a received signal, wherein the received signal includes a leaked portion of the transmitted signal and signal reflected from a user;
    one or more antennas coupled to the transmitter and receiver, the one or more antennas being configured to transmit the transmitted signal and further configured to receive the received signal; and
    a processor coupled to the receiver, the processor having a memory storing instructions that cause the processor to:
    process the received signal;
    determine, based on instructions that cause the processor to process the received signal, that the received signal is below a minimum threshold power;
    in response to the processor being configured to determine that the received signal is below the minimum threshold power, detect that the user is in proximity of the radio device;
    determine a first value and a second value corresponding to respectively a first signal reflected from the user at a first time, and a second signal reflected from the user at a second time, wherein the first value and the second value include signal power levels;
    identify a variation of the first value from the second value;
    determine that the user is in proximity of the radio device in response to identifying the variation; and
    reduce power of the radio device in response to the processor being configured to detect that the user is in proximity of the radio device.

11. The radio device of claim 10, wherein the instructions that cause the processor to process the received signal include instructions that cause the processor to:
    compare the signal reflected from the user against a threshold value; and
    determine that the user is within a particular proximity of the radio device based on the comparing.

12. The radio device of claim 11, wherein the particular proximity is between 0-10 cm.

13. The radio device of claim 10, wherein the instructions that cause the processor to process the demodulated received signal include instructions that cause the processor to:
    identify an estimate of the leaked portion of the transmitted signal; and
    subtract the estimate from the received signal.

14. The radio device of claim 13, wherein the instructions further cause the processor to:
   estimate gain in the leaked portion of the transmitted signal; and
   modify the estimate of the leaked portion based on the estimated gain.

15. The radio device of claim 13, wherein the instructions that cause the processor to process the received signal include instructions that cause the processor to process the received signal a plurality of times during a time period.

16. The radio device of claim 10, wherein the minimum threshold power is set based on a drop of signal power from a drop in gain during power-up of the radio device.

* * * * *

UNITED STATES PATENT AND TRADEMARK OFFICE
CERTIFICATE OF CORRECTION

PATENT NO. : 12,392,881 B2
APPLICATION NO. : 16/920289
DATED : August 19, 2025
INVENTOR(S) : Anders Sven Mattsson et al.

It is certified that error appears in the above-identified patent and that said Letters Patent is hereby corrected as shown below:

In the Claims

In Column 16, Line 63, in Claim 13, after "process the" delete "demodulated".

Signed and Sealed this
Third Day of February, 2026

John A. Squires
*Director of the United States Patent and Trademark Office*